(12) United States Patent
Pellen

(10) Patent No.: US 8,066,431 B2
(45) Date of Patent: Nov. 29, 2011

(54) CABLE TEMPERATURE MONITOR

(75) Inventor: Alain T. Pellen, Boca Raton, FL (US)

(73) Assignee: Lockheed Martin Corporation, Bethesda, MD (US)

(*) Notice: Subject to any disclaimer, the term of this patent is extended or adjusted under 35 U.S.C. 154(b) by 498 days.

(21) Appl. No.: 12/408,549

(22) Filed: Mar. 20, 2009

(65) Prior Publication Data

US 2010/0238972 A1 Sep. 23, 2010

(51) Int. Cl.
*G01K 13/00* (2006.01)
*G01K 1/16* (2006.01)
*G01N 25/72* (2006.01)
*G01N 17/00* (2006.01)

(52) U.S. Cl. .............. 374/152; 374/5; 374/57; 374/141; 374/120

(58) Field of Classification Search .................. 374/152, 374/120, 141, 57, 5
See application file for complete search history.

(56) References Cited

U.S. PATENT DOCUMENTS

| 4,023,412 A | * | 5/1977 | Luke et al. | .......... 374/177 |
| 2006/0251147 A1 | * | 11/2006 | Balan | .......... 374/152 |

* cited by examiner

*Primary Examiner* — Lisa Caputo
*Assistant Examiner* — Mirellys Jagan
(74) *Attorney, Agent, or Firm* — DeMont & Breyer, LLC

(57) ABSTRACT

An apparatus that allows for the testing of multiple wraps of cable in environments of varying temperature, pressure, and in different fluids in a single apparatus, and can be tested against the varying loads the cable may encounter is disclosed. In the illustrative embodiment of the present invention, the multiple wraps of cable are simulated by layering electrically-insulated portions of the cable on top of one another inside an environmentally controlled container. This container has two parts: a thermally-insulated container and a pressure container.

27 Claims, 3 Drawing Sheets

CABLE TEMPERATURE MONITOR

FIELD OF THE INVENTION

The present invention relates to quality testing in general, and, more particularly, to the testing of cables.

BACKGROUND OF THE INVENTION

Cables are used for the transporting energy and information. Often, these cables are very long and even stretch across oceans. Different environments pose different challenges to the cables. When a cable has to cover a long distance, it will face different environments.

In order to determine which cables are best for a particular environment, it would have to be tested in the different environments. This means that the cable would have to be tested against different temperatures, different fluids, different levels of pressure, etc.

For each of these variables, the cable would have to be tested against the varying loads that pass through the cables. Testing any particular type of cable against these variables is very difficult.

Often these cables are wrapped on spools. When wrapped on a spool, a cable is often underneath several layers of itself, and the additional pressure of the mass of the cable and the heat from the layers of cable above and below it can damage the cable.

To test cable, it would have to be taken to the place in which it is to be used, and then subjected to all the environmental factors and varying loads it can be expected to face. This, however, is not practical.

Often these cables are intended to be used at the bottom of the ocean, with salt water, low temperatures and high pressures. Other times cables are used in very frigid environments with extremely low temperatures, high winds, and freezing rain and snow. It is not practical to monitor cable at these locations for extended periods of time under varying power loads.

SUMMARY OF THE INVENTION

The present invention allows for the testing of multiple wraps of cable in environments of varying temperature, pressure, and in different fluids in a single apparatus, and can be tested against the varying electrical loads the cable may encounter.

In the illustrative embodiment of the present invention, the multiple wraps of cable are simulated by layering electrically-insulated portions of the cable on top of one another inside an environmentally controlled container. This container has two parts: a thermally-insulated container and a pressure container.

In accordance with the illustrative embodiment of the present invention, portions of the cable are stripped of its insulation and placed outside the pressure container to allow thick cable to lie on top of itself as it would in a large spool.

The pressure container can be filled with air, water, or other fluid and the temperature and pressure inside the container can be controlled. This allows for testing of the different environments that the cable might encounter.

In accordance with the illustrative embodiment of the present invention, the ends of the cable are then connected to semi-conductors which allow for energy to pass through the cable and thus the cable can be tested against the various loads that the cable may encounter in the different environments.

DETAILED DESCRIPTION

Figure 1:
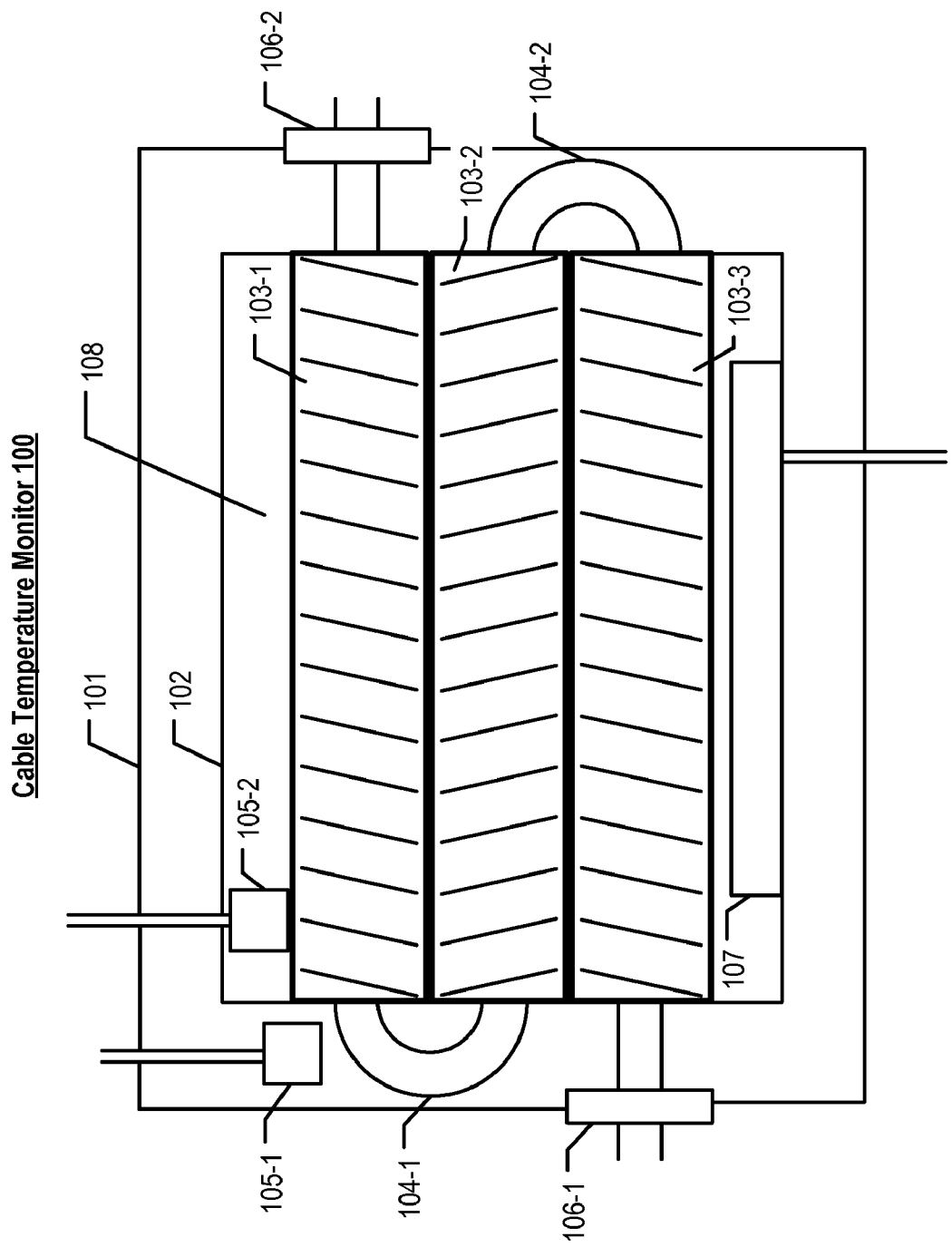
FIG. 1 depicts a schematic diagram of the cable temperature monitor 100 in accordance with the illustrative embodiment of the present invention.

FIG. 1 depicts a schematic diagram of the cable temperature monitor 100 in accordance with the illustrative embodiment of the present invention. Cable temperature monitor 100 comprises: thermally-insulated container 101, pressure container 102, electrically-insulated cable 103-1, electrically-insulated cable 103-2, electrically-insulated cable 103-3, un-insulated cable 104-1, un-insulated cable 104-2, temperature sensor 105-1, temperature sensor 105-2, semi-conductor 106-2, semi-conductor 106-2, and temperature-control device 107, and fluid 108.

Although the illustrative embodiment comprises one insulated container, it will be clear to those skilled in the art, after reading this disclosure, how to make and use alternative embodiments that comprise any number of insulated containers.

Although the illustrative embodiment comprises one pressure container, it will be clear to those skilled in the art, after reading this disclosure, how to make and use alternative embodiments that comprise any number of pressure containers.

Although the illustrative embodiment comprises three wraps of electrically-insulated cable, it will be clear to those skilled in the art, after reading this disclosure, how to make and use alternative embodiments that comprise any number wraps of electrically-insulated cable.

Although the illustrative embodiment comprises two bends of un-insulated cable, it will be clear to those skilled in the art, after reading this disclosure, how to make and use alternative embodiments that comprise any number bends of un-insulated cable.

Although the illustrative embodiment comprises two temperature sensors, it will be clear to those skilled in the art, after reading this disclosure, how to make and use alternative embodiments that comprise any number temperature sensors.

Although the illustrative embodiment comprises two semi-conductors, it will be clear to those skilled in the art, after reading this disclosure, how to make and use alternative embodiments that comprise any number semi-conductors.

Although the illustrative embodiment comprises one temperature-control device, it will be clear to those skilled in the art, after reading this disclosure, how to make and use alternative embodiments that comprise any number temperature-control devices.

It will be clear to one skilled in the art, after reading this disclosure, how to make and use cable temperature monitor 100.

Thermally-insulated container 101 is a container that is insulated in order to maintain a constant temperature inside the thermally-insulated container and to reduce the rate of heat transfer.

It will be clear to one skilled in the art, after reading this disclosure, how to make and use thermally-insulated container 101. Although in the illustrative embodiment, thermally-insulated container 101 is a double-walled vacuum container, but it will be clear to one skilled in the art, after reading this disclosure, how to make and use alternative embodiments of the present invention in which thermally-insulated container 101 is comprised of another material, for example, and without limitation: cellulose, fiberglass, polystyrene, aramid fiber, and urethane foam.

Pressure container 102 is a closed container designed to hold fluids at a pressure different from the ambient pressure. In accordance with the illustrative embodiment of the present invention, pressure container 102 is a metal container, but it will be clear to one skilled in the art, after reading this disclosure how to make and use alternative embodiments of the present invention in which pressure container 102 is comprised of another material. It will be clear to one skilled in the art, after reading this disclosure, how to make and use pressure container 102.

Electrically-insulated cable 103-1, electrically-insulated cable 103-2, and electrically-insulated cable 103-3, are a series of strands wrapped in an electrically insulating material. In accordance with the illustrative embodiment of the present invention, the strands would be comprised of a metal, such as copper, but it will be clear to one skilled in the art, after reading this disclosure, how to make and use alternative embodiments of the present invention in which the strands of electrically-insulated cable 103-1 through 103-3 is comprised of another material, for example, and without limitation: steel, gold, aluminum, etc.

In accordance with the illustrative embodiment of the present invention, the electrical insulation would be comprised of a electrically non-conductive material, such as polyethylene, but it will be clear to one skilled in the art, after reading this disclosure, how to make and use alternative embodiments of the present invention in which the electrical insulation of cable 103-1 through 103-3 is comprised of another material, for example, and without limitation: vulcanized rubber, polypropylene, polyvinyl chloride (PVC), poly(tetrafluoroethylene) (known by the brand name of Teflon®), etc. It will be clear to one skilled in the art, after reading this disclosure, how to make and use electrically-insulated cable 103-1, electrically-insulated cable 103-2, and electrically-insulated cable 103-3.

Un-insulated cable 104-1, un-insulated cable 104-2 are the portions of electrically-insulated cable 103-1 through electrically-insulated cable 103-3 with the electrical insulation removed. It will be clear to one skilled in the art, after reading this disclosure, how to make and use un-insulated cable 104-1 and un-insulated cable 104-2. It will also be clear to one skilled in the art, after reading this disclosure, how to make and use alternative embodiments of the present invention in which un-insulated cable 104-1 and un-insulated cable 104-2 are a series of smaller cables, which may or may not be themselves electrically insulated.

Temperature sensor 105-1 and temperature sensor 105-2 are devices which measure the temperature of the cable as it is used. In accordance with the illustrative embodiment of the present invention, temperature sensor 105-1 and temperature sensor 105-2 are infra-red thermometers, but it will be clear to one skilled in the art, after reading this disclosure, how to make and use alternative embodiments of the present invention in which temperature sensor 105-1 and temperature sensor 105-2 is comprised of, for example, and without limitation: a resistive temperature detector, a thermocouple, a thermistor, a mercury thermometer, an alcohol thermometer, liquid crystal thermometer, etc. It will be clear to one skilled in the art, after reading this disclosure, how to make and use temperature sensor 105-1 and temperature sensor 105-2.

Semi-conductor 106-1 and semi-conductor 106-2 are electrically-conductive materials to allow electricity to pass through with minimal heat transfer in order to maintain a constant temperature inside the thermally-insulated container.

In accordance with the illustrative embodiment of the present invention, semi-conductor 106-1 and semi-conductor 106-2 would be comprised of a material, such as bismuth telluride, but it will be clear to one skilled in the art, after reading this disclosure, how to make and use alternative embodiments of the present invention in which the semi-conductor 106-1 and semi-conductor 106-2 is comprised of another material that minimizes heat transfer, for example, and without limitation: lead telluride, a silicon-germanium alloy, etc. It will be clear to one skilled in the art, after reading this disclosure, how to make and use semi-conductor 106-1 and semi-conductor 106-2.

Temperature-control device 107 is a heat-pump that can add heat to or remove heat from inside of thermally-insulated container 101. It will be clear to one skilled in the art, after reading this disclosure, how to make and use temperature-control device 107.

Fluid 108 is a fluid in which electrically-insulated cable 103-1, electrically-insulated cable 103-2, and electrically-insulated cable 103-3 are immersed. In accordance with the illustrative embodiment, fluid 108 is comprised of, for example, and without limitation: air, sea water, fresh water, or any other fluid under varying temperatures and pressures. It will be clear to one skilled in the art, after reading this disclosure how to make and use fluid 108.

Figure 2:
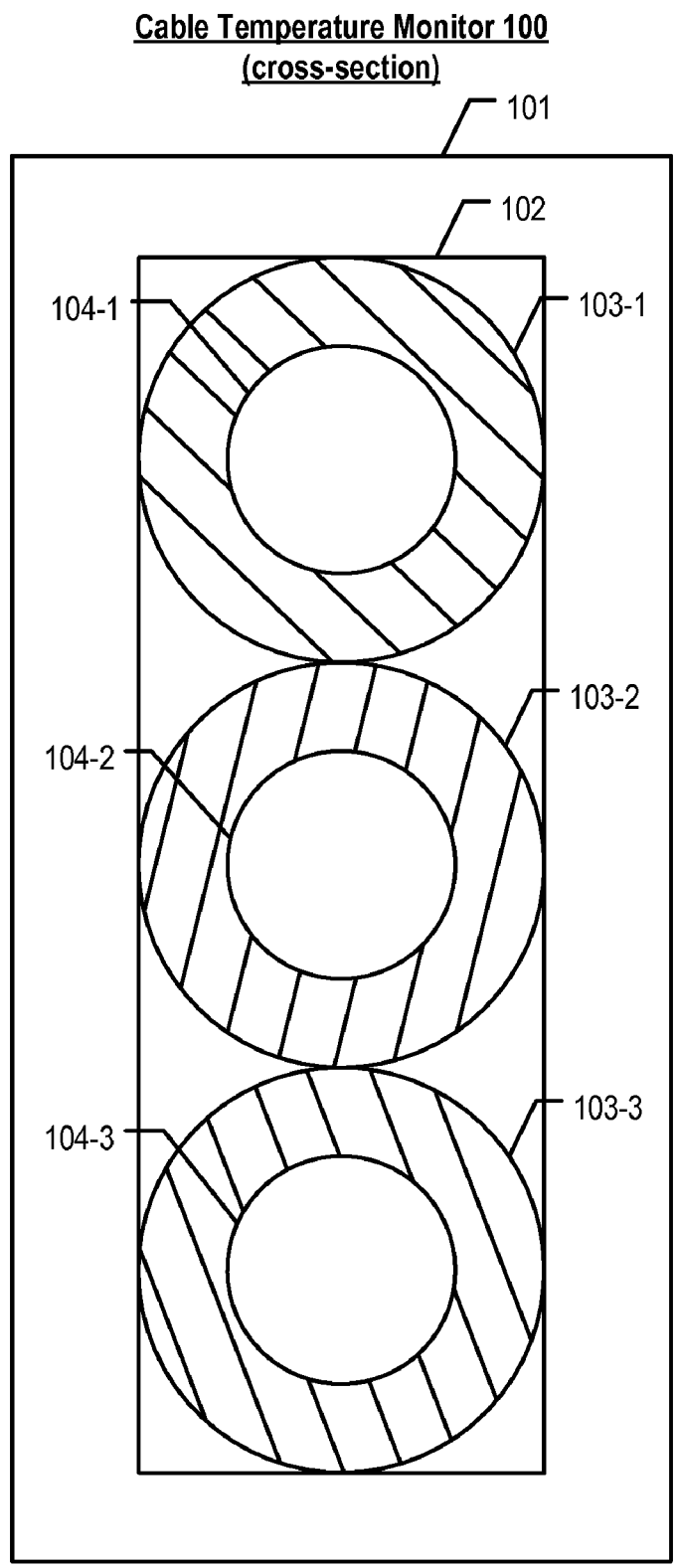
FIG. 2 depicts a schematic diagram of the cable temperature monitor 100, in cross-section, in accordance with the illustrative embodiment of the present invention.

FIG. 2 depicts a schematic diagram of the cable temperature monitor 100, in cross-section, in accordance with the illustrative embodiment of the present invention. Cable temperature monitor 100 comprises: thermally-insulated container 101, pressure container 102, electrically-insulated cable 103-1, electrically-insulated cable 103-2, electrically-insulated cable 103-3, un-insulated cable 104-1, and un-insulated cable 104-2.

Although the illustrative embodiment comprises three wraps of electrically-insulated cable, it will be clear to those skilled in the art, after reading this disclosure, how to make and use alternative embodiments that comprise any number wraps of electrically-insulated cable.

Figure 3:
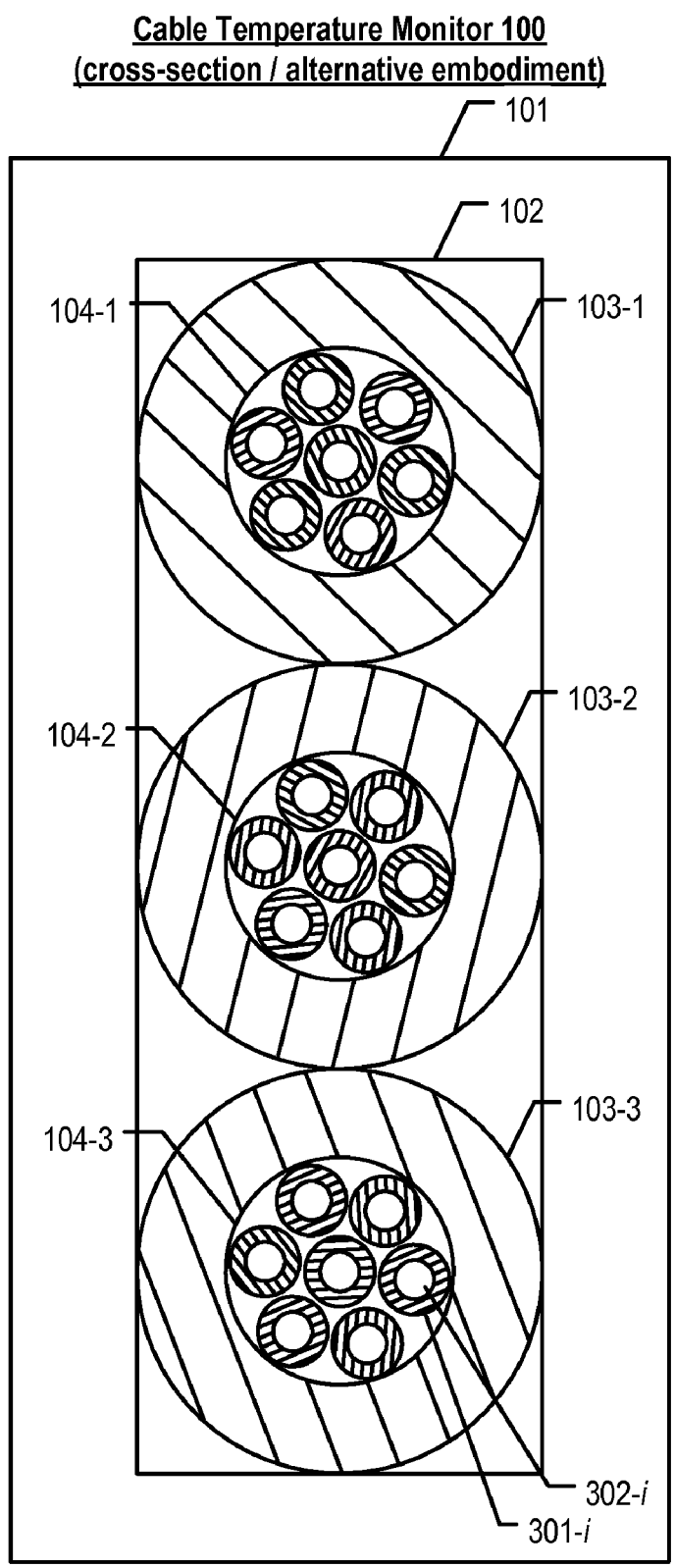
FIG. 3 depicts a schematic diagram of the cable temperature monitor 100, in cross-section, in accordance with an alternative embodiment of the present invention.

FIG. 3 depicts a schematic diagram of the cable temperature monitor 100, in cross-section, in accordance with an alternative embodiment of the present invention. Cable temperature monitor 100 comprises: thermally-insulated container 101, pressure container 102, electrically-insulated cable 103-1, electrically-insulated cable 103-2, electrically-insulated cable 103-3, un-insulated cable 104-1, and un-insulated cable 104-2, and smaller, electrically-insulated cable **301-*i*, where i is a number between 0 and I, and smaller, un-insulated cable 302-*i***, where i is a number between 0 and I.

Although the illustrative embodiment comprises three wraps of electrically-insulated cable, it will be clear to those skilled in the art, after reading this disclosure, how to make and use alternative embodiments that comprise any number wraps of electrically-insulated cable.

Although the illustrative embodiment comprises seven smaller electrically insulated cables, it will be clear to one skilled in the art, after reading this disclosure how to make and use alternative embodiments of smaller, electrically-insulated cable **301-*i***.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
a cable that is divided into at least two electrically-insulated sections with an un-insulated section of the cable between the two electrically-insulated sections of cable;
a pressure container;
a thermally-insulated container;
wherein the electrically-insulated sections of the cable are inside the pressure container and the electrically un-insulated section is outside of the pressure container; and
wherein the cable and the pressure container are inside of the thermally-insulated container.

2. The apparatus of claim 1 wherein the thermally-insulated container is temperature controlled.

3. The apparatus of claim 1 further comprising:
a first semi-conductor connected to one end of the cable;
a second semi-conductor connected to the other end of the cable;
wherein the first semi-conductor and second semi-conductor connect the ends of the cable to a power source.

4. The apparatus of claim 1 further comprising a temperature-control device.

5. The apparatus of claim 1 wherein:
the cable is divided into three electrically-insulated sections and two un-insulated sections, and
the two un-insulated sections are between the three electrically-insulated sections.

6. The apparatus of claim 5 wherein the electrically-insulated sections are abutting.

7. The apparatus of claim 1 further comprising a temperature sensor.

8. The apparatus of claim 7 wherein the temperature sensor is a non-contact temperature sensor.

9. The apparatus of claim 7 wherein the temperature sensor is outside the pressure chamber.

10. The apparatus of claim 7 wherein the temperature sensor is inside the pressure chamber.

11. An apparatus comprising:
a cable that is divided into two electrically-insulated sections with an un-insulated section of the cable between the two electrically-insulated sections of cable; and
a pressure container;
wherein the electrically-insulated sections of the cable are inside the pressure container and the electrically un-insulated section is outside of the pressure container; and
wherein the electrically-insulated sections of the cable are abutting.

12. The apparatus of claim 11 further comprising:
a first semi-conductor connected to one end of the cable;
a second semi-conductor connected to the other end of the cable;
wherein the first semi-conductor and second semi-conductor connect the ends of the cable to a power source.

13. The apparatus of claim 11 further comprising:
a thermally-insulated container;
wherein the pressure container is inside the thermally-insulated container.

14. The apparatus of claim 13 wherein the thermally-insulated container is temperature controlled.

15. The apparatus of claim 13 wherein the pressure container is temperature controlled.

16. The apparatus of claim 13 further comprising a temperature sensor.

17. The apparatus of claim 16 wherein the temperature sensor is a non-contact temperature sensor.

18. The apparatus of claim 16 wherein the temperature sensor is outside the pressure chamber.

19. The apparatus of claim 16 wherein the temperature sensor is inside the pressure chamber.

20. An apparatus comprising:
a cable that is divided into two electrically-insulated sections with an un-insulated section of the cable between the two electrically-insulated sections of cable;
a thermally-insulated container;
wherein the electrically-insulated sections of the cable and the electrically un-insulated section is inside the thermally-insulated container; and
wherein the electrically-insulated sections of the cable are abutting.

21. The apparatus of claim 20 wherein the thermally-insulated container is temperature controlled.

22. The apparatus of claim 20 further comprising:
a first semi-conductor connected to one end of the cable;
a second semi-conductor connected to the other end of the cable;
wherein the first semi-conductor and second semi-conductor connect the ends of the cable to a power source.

23. The apparatus of claim 20 further comprising a temperature sensor.

24. The apparatus of claim 23 wherein the temperature sensor is a non-contact temperature sensor.

25. The apparatus of claim 20 further comprising a pressure chamber, wherein the electrically-insulated sections of the cable are inside the pressure chamber and the electrically un-insulated section is outside of the pressure chamber.

26. The apparatus of claim 25 further comprising a temperature sensor, wherein the temperature sensor is outside the pressure chamber.

27. The apparatus of claim 25 further comprising a temperature sensor, wherein the temperature sensor is inside the pressure chamber.

* * * * *